No. 734,518. Patented July 28, 1903.

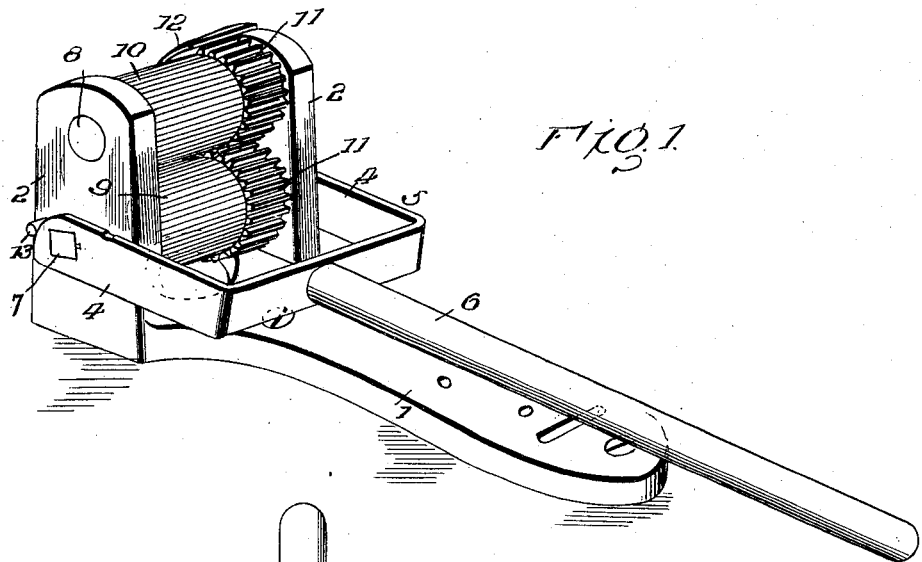
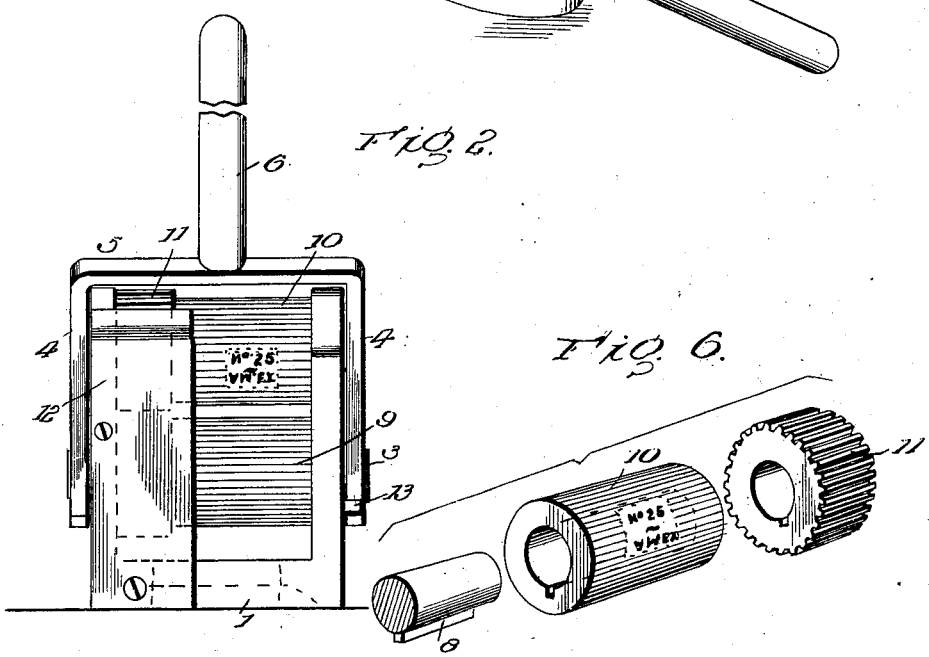

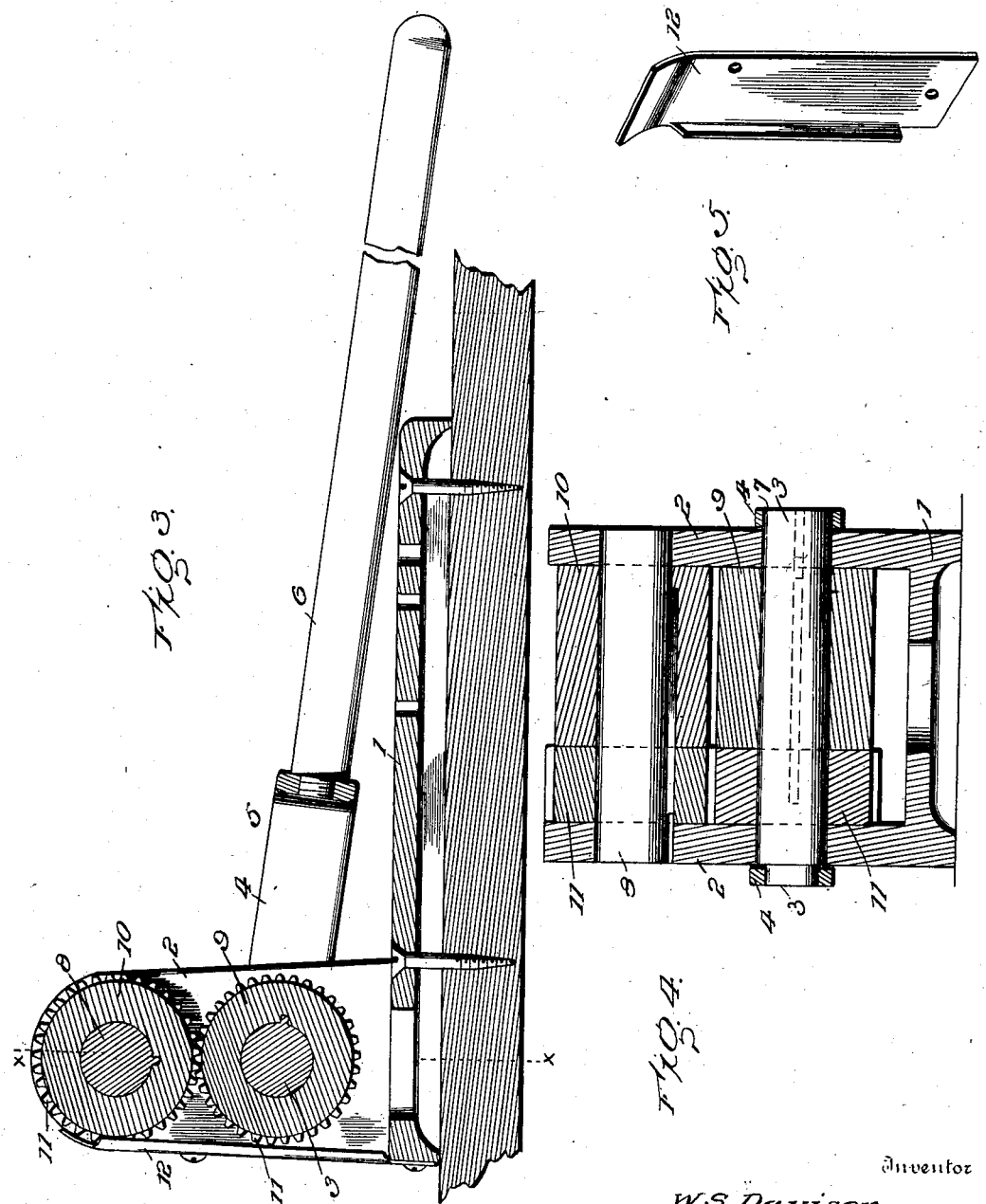

UNITED STATES PATENT OFFICE.

WILLIAM S. DAVISON, OF JANESVILLE, WISCONSIN.

SEAL-PRESS.

SPECIFICATION forming part of Letters Patent No. 734,518, dated July 28, 1903.

Application filed January 2, 1903. Serial No. 137,552. (No model.)

*To all whom it may concern:*

Be it known that I, WILLIAM S. DAVISON, a citizen of the United States, residing at Janesville, in the county of Rock and State of Wisconsin, have invented certain new and useful Improvements in Seal-Presses, of which the following is a specification.

This invention provides a novel machine for clenching seals of lead and like metal upon the ends of cord, wire, or analogous flexible fasteners employed for securing bags, packages, and any article to be protected from unscrupulous and mischievous persons.

The invention consists of a pair of pressure-rolls having a surface dressed or provided with any insignia to be impressed upon the seal when clenching the same upon the fastener and novel mountings and operating means for the pressure-rolls, substantially as hereinafter set forth, illustrated, and finally claimed.

In the accompanying drawings, forming a part of the specification, Figure 1 is a perspective view of a seal-press embodying the invention. Fig. 2 is a front view. Fig. 3 is a longitudinal section. Fig. 4 is a transverse section about on the line X X of Fig. 3. Fig. 5 is a perspective view of the guard detached. Fig. 6 is a detail perspective view of a gear-wheel, a sleeve-die, and a portion of the shaft therefor.

Corresponding and like parts are referred to in the following description and indicated in all the views of the drawings by the same reference characters.

The frame of the machine comprises a base-piece 1 and uprights 2, the latter being spaced apart and located at one end of the base and constituting bearings for the pressure-rolls by means of which the seal is clenched or compressed. The parts 1 and 2 may be integrally formed or may be separate and secured together in any substantial way. The base 1 may be constructed to form a convenient handle or may be provided with openings to receive fastenings for securing the machine to a table or other convenient support.

The pressure-rolls consist, preferably, of shafts and tubular or sleeve dies slipped thereon. The shaft 3 of the lower pressure-roll is journaled in the openings or bearings provided in the standards 2, near the base, and its end portions project beyond opposite sides of said standards for the reception of the bifurcations 4 of a forked frame 5, terminating in an operating-handle 6. One of the extended ends of the shaft 3 is made angular, as shown at 7, to enter a corresponding opening of the bifurcation or member 4 of the frame 5, whereby said shaft is caused to turn in its bearings as the handle 6 is oscillated. The shaft 8 of the upper pressure-roll is of a length to come about flush with the outer sides of the standards 2, so as not to interfere with the oscillatory movements of the frame 5 in the operation of the machine. The tubular or sleeve die 9 is slipped upon the shaft 3 and is keyed thereto, so as to turn therewith, and the tubular or sleeve die 10 is mounted upon the shaft 8 and keyed for rotation therewith. The dies 9 and 10 are dressed or provided with any suitable inscription or insignia, according to the matter to be impressed upon the seal when compressing or clenching the same upon the fastener or tie.

A gear-wheel 11 is slipped upon corresponding ends of each of the shafts 3 and 8, and these gear-wheels are keyed to the shafts to turn therewith and are of like diameter and formed with teeth of equal pitch, said gear-wheels having their toothed portions in mesh, whereby both pressure-rolls are caused to positively turn upon operation of the handle 6. The combined length of a gear-wheel and die is about equal to the distance between the standards 2, the end portions of the shafts projecting so as to obtain a bearing in the said standards 2. A plate 12 is secured to one of the standards 2 and the end of the base 1 and extends in front of the gear-wheels 11 and constitutes a housing or guard to prevent the seal, any portion of the package, the clothing, or other article from being caught between the teeth or cogs of the gear-wheels. The upper end of the guard-plate 12 curves slightly, and its inner vertical edge is bent toward the pressure-rolls, so as to preclude the entrance of any article between the gear-wheels in the operation of the machine. A stop 13 is applied to one of the standards for engagement with a bifurcation or side member of the frame 5, so as to limit its forward movement and properly position the insignia of the pressure roll or rolls to insure its impression upon the seal after the same has been compressed or clenched. After the seal, which may be of any pattern, has been applied to the fastener or tie and is in condition to be made fast it is passed between the pressure-rolls and is compressed by oscillating the handle 6, the seal being drawn between the pressure-rolls and being clenched and at the same time receiving the insignia which is impressed upon the sides thereof. The forward and downward movement of the handle 6 draws the seal between the pressure-rolls, and a reverse movement of the handle causes the seal to pass from between the pressure-rolls, as will be readily comprehended.

Having thus described the invention, what is claimed as new is—

1. A seal-press comprising a frame having spaced standards, geared pressure-rolls journaled in said standards, one of said pressure-rolls having terminal portions projected beyond the outer sides of the standards, and a forked frame embracing the standards and secured to the extended ends of the pressure-roll and provided with an operating-handle, substantially as set forth.

2. In a seal-press, a frame provided with spaced standards, pressure-rolls journaled in said standards, one of the pressure-rolls comprising a shaft having its end portions extended beyond the outer sides of the standards, a sleeve-die, and a gear-wheel slipped upon said shaft and keyed thereto, and an operating-handle comprising a forked portion embracing the standards and fitted to the extended ends of the projected shaft and secured thereto to effect movement of the pressure-rolls in the operation of the machine, substantially as specified.

3. The herein-described seal-press comprising a base provided at one end with spaced standards, shafts journaled in said standards, one of said shafts having its end portions extended, sleeve-dies and gear-wheels slipped upon the shafts and keyed thereto, a guard secured to a standard and extended in front of said gear-wheels, and an operating-handle having a forked frame with its members embracing said standards and secured to the extended ends of the projected shaft, substantially as set forth.

In testimony whereof I affix my signature in presence of two witnesses.

WILLIAM S. DAVISON. [L. S.]

Witnesses:
LACY GWIN,
H. R. MACDONALD.